Oct. 12, 1965  W. L. W. HARTMANN  3,211,420
STOPCOCK WITH SPHERICAL PLUG
Filed Oct. 25, 1962  3 Sheets-Sheet 1

INVENTOR
WERNER L. W. HARTMANN

BY *Imirie and Smiley*
ATTORNEYS

Oct. 12, 1965  W. L. W. HARTMANN  3,211,420
STOPCOCK WITH SPHERICAL PLUG
Filed Oct. 25, 1962  3 Sheets-Sheet 2
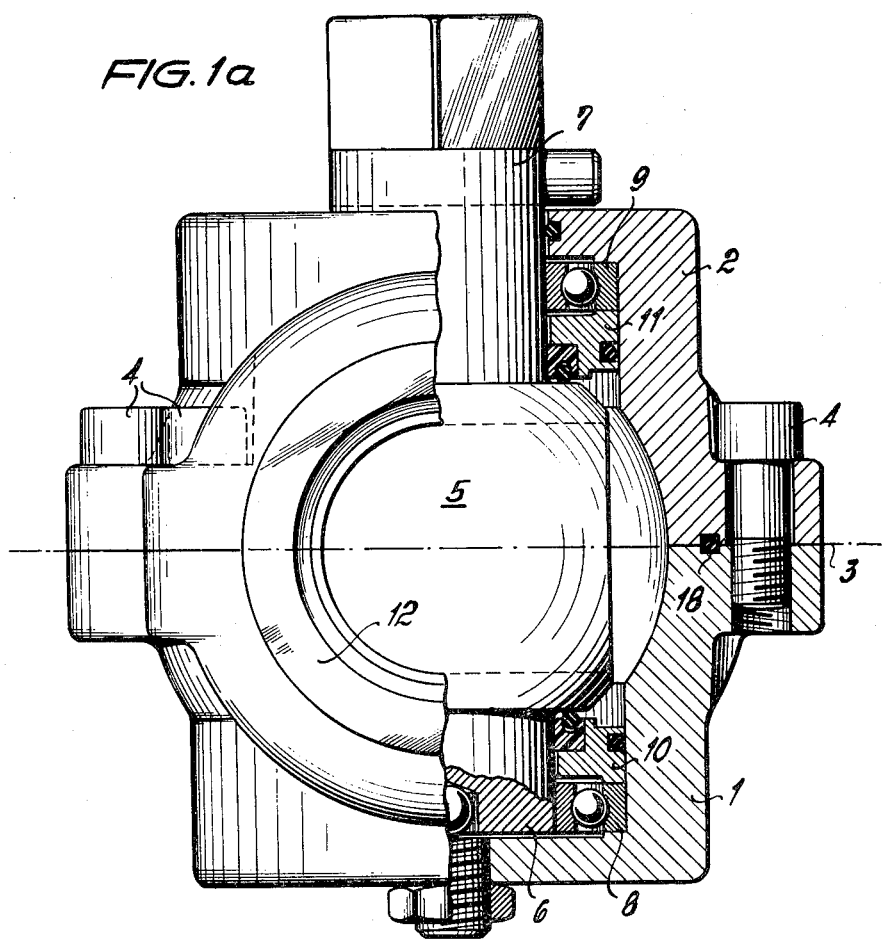
FIG. 1a
FIG. 2
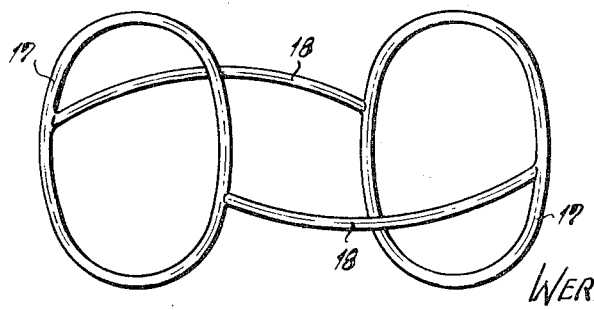
INVENTOR
WERNER L. W. HARTMANN United States Patent Office 3,211,420
Patented Oct. 12, 1965

3,211,420
STOPCOCK WITH SPHERICAL PLUG
Werner L. W. Hartmann, 20a Ehlershausen,
Hannover, Germany
Filed Oct. 25, 1962, Ser. No. 232,952
Claims priority, application Germany, Nov. 30, 1961,
H 44,276
2 Claims. (Cl. 251—309)

This invention relates to a stopcock having a ball shaped plug which is mounted within the cock housing by means of a pair of axial trunnions, the flow-through bore in the housing being sealed with respect to the plug by sealing rings which are shiftable in the housing, within certain limits, in the direction of the bore and are guided at their peripheries.

It is an important object of the invention to construct such stopcocks of simple parts that can be easily manufactured and assembled, and so arranged that the stopcock can be easily disassembled even after it has been incorporated or built into a conduit.

Stopcocks with spherical plugs, contrary to those with cylindrical or conical plugs, cannot be readily disassembled by pulling the plug out of the housing in the axial direction of the plug, as its periphery is partially overlapped in the axial direction by the sealing rings. Thus, the sealing rings have to be pulled out when removing the plug.

In a previously proposed structure, it is made possible to pull out the plug together with the sealing rings by guiding the latter only with their end faces which face away from the plug along correspondingly planar inner surfaces of the housing. But such structure has the disadvantages that when the plug is actuated, the sealing rings, because they are not guided laterally, may become wedged between plug and housing, whereby operation is made difficult and, moreover, the sealing seat is damaged.

To overcome the aforementioned problem, the present invention provides for guidance of the sealing rings, either directly or indirectly, completely about their peripheries. This is made possible in a shut-off valve, while permitting easy removal of the sealing piece, or plug, and the rubber body encompassing the former, by dividing the housing into an upper and a lower half in a plane extending through the axis of the flow-through bore and at right angles to the direction of movement of the plug, and by providing the flow-through bores of the housing within pipe sections which are positively held in place by the two joined housing halves.

In accordance with the invention, this construction of the housing is employed in a stopcock having a spherical plug, which plug is mounted by means of two, diametrically aligned axle trunnions within the stopcock housing, the sealing of the flow-through bore in the housing with respect to the plug being effected by means of sealing rings which are shiftable in the housing, within certain limits, in the direction of the flow-through bore, and are guided at their peripheries. In this divided construction of the housing, the sealing of the two pipe sections with respect to the housing, and of the two housing halves with respect to each other, poses a special problem which, however, is solved according to the invention by effecting the sealing by means of a three-dimensionally arranged, interconnected seal consisting of one respective sealing ring provided at the periphery of each of the two pipe sections and of two sealing arcs which connect these sealing rings and lie in the dividing plane of the housing.

There are various possibilities for the application and construction of the sealing rings per se, i.e., those for the plug. For example, it is possible to guide the sealing rings at their outer periphery directly within the housing. Alternatively, the sealing rings can be guided by their outer peripheries in a groove in each of the pipe sections. In both cases, the end faces of the sealing rings facing away from the plug and the end faces of the pipe sections adjoining thereto may be made flat and may be sealed with respect to one another by means of a sealing washer which is provided in an annular groove in one of the end faces.

The effective diameter of the sealing washer between sealing ring and pipe section may easily be chosen, in a manner known per se, such that the sealing rings are always pressed to the plug by the pressure in the pipe, independently of the direction of the pressure in the stopcock.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which;

FIG. 1a is a similar elevation partly in section viewed in the direction of the flow-through bore;

FIG. 2 is a perspective view of the sealing member provided between the housing halves and the pipe sections.

Figure 1:
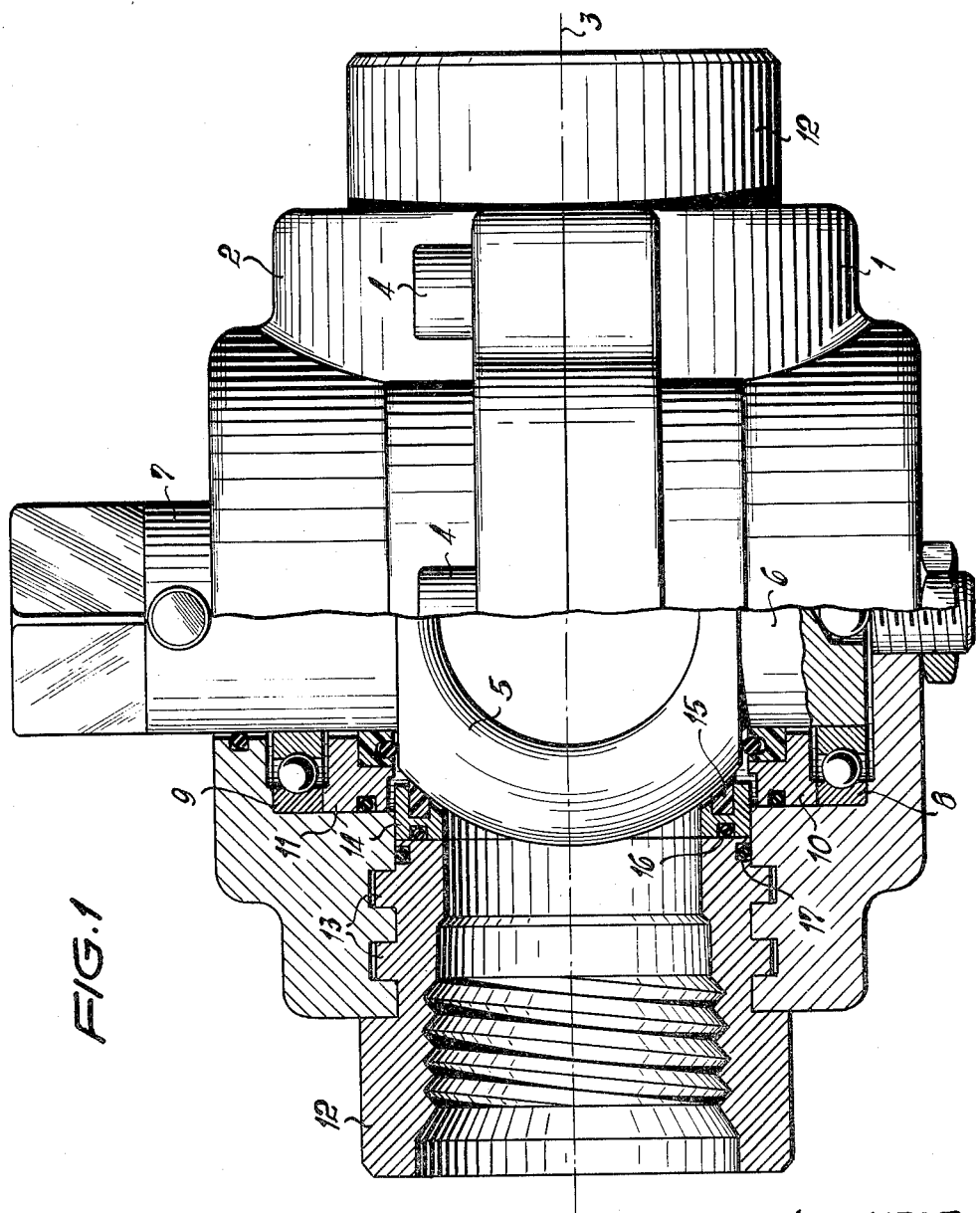
FIG. 1 is a side elevation partially in section of a stopcock constructed in accordance with the invention.
Figure 1B:
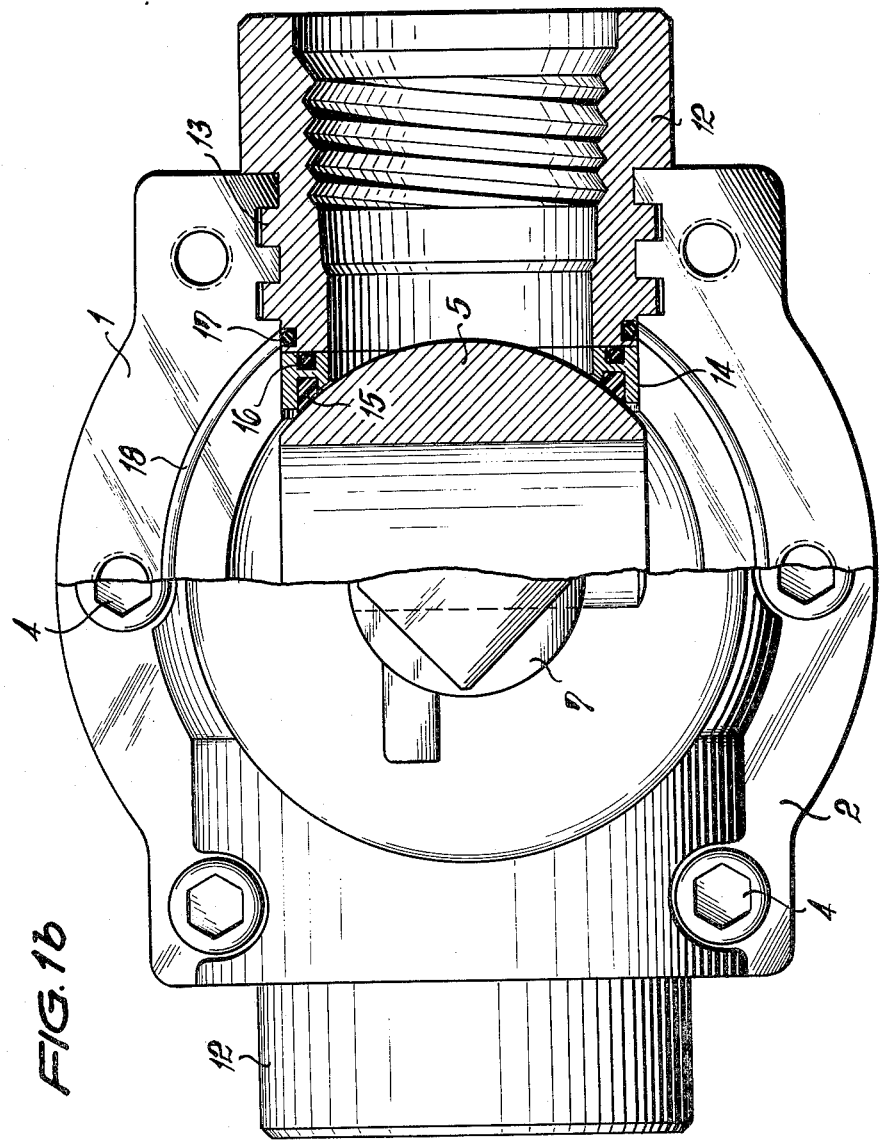
FIG. 1b is a plan view of the stopcock, partially in section.

As can be seen especially from FIGS. 1, 1a and 1b, the stopcock comprises a pair of substantially symmetrical housing halves, the lower housing half 1 and the upper housing half 2 divided along a parting line 3 which lies in the horizontal plane including the axis of the flow-through bore and at right angles to the axis of the plug 5. The two halves of the housing, 1 and 2, are held together by screws 4.

The spherical plug 5 is mounted in the housing halves 1 and 2 with its axial trunnions 6 and 7 journaled in roller bearings 8 and 9. The sealing of the inner space of the plug with respect to the outside and to the bearings is accomplished in a known manner by rings 11 which are sealed with respect to the trunnions 6 and 7, as well as against the housing halves 1 and 2.

The flow-through bores of the housing are provided in pipe sections 12 which are fashioned as pipe connections. The pipe sections 12 are positively held by the assembled halves 1 and 2 of the housing through annular collars 13 provided at the periphery of each pipe section and corresponding annular grooves which seat the collars in the housing halves 1 and 2.

The sealing of the outer peripheries of the pipe sections 12 is accomplished by means of annular sealing washers 17 and the sealing of the housing halves 1 and 2 with respect to each other is achieved by sealing arcs 18 lying in the dividing plane 2 of the housing. Desirably the arcs 18, as best seen in FIG. 2, integrally connect the annular sealing washers 17 to each other at the points lying in the dividing plane 3. The complete seal, therefore, is formed of one piece in a three-dimensional construction which lies in three different planes. Each sealing ring 14 is provided with an elastic sealing insert 15 at the surface facing the plug 5 and is sealed with respect to the end face of the adjacent pipe section 12 by means of an O-ring 16 arranged in a groove either in the end face of the sealing rings 14 (as FIG. 1 shows) or in a groove in the adjoining end face of the pipe section, the ungrooved meeting face of the pipe section or sealing ring respectively being flat.

The above described embodiment has the advantage that the plug 5, together with the sealing rings 14, may upon turning the plug 90°, as viewed in FIG. 1, and after removing the upper housing half 2, easily be pulled out upwardly, whereby the pipe sections 12 may remain connected with the lower housing half 1. This is possible because the fluid passage opening in the spherical plug shortens or cuts off the sphere along one diameter.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A stopcock comprising a pair of aligned pipe sections, a housing coupling said pipe sections to define a flow-through bore, a revolvable spherical plug having a diametrically aligned pair of trunnions mounted in said housing, a pair of sealing rings axially shiftable with respect to the flow-through bore in the housing and guided at their peripheries to seal the flow-through bore with respect to said plug, said housing being formed in symmetrical halves divided in a plane including the axis of the flow-through bore and at right angles to said trunnions, said pipe sections being provided with annular parts interfitting with mating parts on said housing halves whereby said pipe sections are positively secured against axial movements by the two assembled housing halves, said pipe sections and said sealing rings having adjoining end faces which are flat, one face of each pair of adjoining faces being provided with an annular groove, an O-ring seated in said groove for sealing purposes, and a sealing member for sealing said pipe sections with respect to the housing and for sealing of the two housing halves with respect to each other, said sealing member comprising a second pair of sealing rings, one engaging the outer periphery of each of said pipe sections, and a pair of sealing arcs connecting said second pair of sealing rings with each other and lying in the dividing plane of the housing halves.

2. A stopcock according to claim 1 wherein said sealing member including the second pair of sealing rings and pair of sealing arcs is completely spaced from said spherical plug and engages only said pipe sections and housing halves.

References Cited by the Examiner

UNITED STATES PATENTS

| | | | |
|---|---|---|---|
| 1,488,296 | 3/24 | Stevens | 251—174 |
| 1,942,155 | 1/34 | Stevens | 251—174 X |
| 2,240,711 | 5/41 | Miller | 137—375 |
| 2,868,498 | 1/59 | Kaiser | 251—172 |
| 3,037,738 | 6/62 | Jackson | 251—172 |
| 3,039,484 | 6/62 | Bredtschneider | 251—315 X |
| 3,091,428 | 5/63 | Magos | 251—174 X |
| 3,095,177 | 6/63 | Muller | 251—306 X |

FOREIGN PATENTS

| | | |
|---|---|---|
| 1,102,510 | 3/61 | Germany. |
| 521,391 | 3/55 | Italy. |

ISADOR WEIL, *Primary Examiner.*

CLARANCE R. GORDON, *Examiner.*